US009405683B2

(12) United States Patent
Park et al.

(10) Patent No.: US 9,405,683 B2
(45) Date of Patent: Aug. 2, 2016

(54) PROCESSOR AND MEMORY CONTROL METHOD FOR ALLOCATING INSTRUCTIONS TO A CACHE AND A SCRATCH PAD MEMORY

(75) Inventors: Il Hyun Park, Yongin-si (KR); Soojung Ryu, Cheonan-si (KR); Dong-Hoon Yoo, Seoul (KR); Dong Kwan Suh, Uiwang-si (KR); Jeongwook Kim, Seongnam-si (KR); Choon Ki Jang, Seoul (KR)

(73) Assignees: Samsung Electronics Co., Ltd., Suwon-si (KR); Seoul National University Industry Foundation, Seoul (KR)

( * ) Notice: Subject to any disclaimer, the term of this patent is extended or adjusted under 35 U.S.C. 154(b) by 253 days.

(21) Appl. No.: 13/045,752

(22) Filed: Mar. 11, 2011

(65) Prior Publication Data

US 2011/0219193 A1 Sep. 8, 2011

Related U.S. Application Data

(63) Continuation-in-part of application No. 12/048,658, filed on Mar. 14, 2008, now Pat. No. 9,015,451.

(30) Foreign Application Priority Data

Nov. 6, 2007 (KR) ........................ 10-2007-0112852

(51) Int. Cl.

| | |
|---|---|
| ***G06F 15/00*** | (2006.01) |
| ***G06F 7/38*** | (2006.01) |
| ***G06F 9/00*** | (2006.01) |
| ***G06F 9/44*** | (2006.01) |
| ***G06F 12/08*** | (2016.01) |
| *G06F 9/50* | (2006.01) |

(52) U.S. Cl.

CPC ............ *G06F 12/08* (2013.01); *G06F 12/0871* (2013.01); *G06F 9/5016* (2013.01)

(58) Field of Classification Search

None

See application file for complete search history.

(56) References Cited

U.S. PATENT DOCUMENTS

| | | | | |
|---|---|---|---|---|
| 5,603,050 | A * | 2/1997 | Wolford et al. | 710/1 |
| 5,845,321 | A * | 12/1998 | Ito et al. | 711/118 |
| 5,966,734 | A * | 10/1999 | Mohamed et al. | 711/173 |
| 2001/0037432 | A1 * | 11/2001 | Hotta et al. | 711/129 |
| 2004/0103410 | A1 * | 5/2004 | Sakai | 717/146 |

(Continued)

FOREIGN PATENT DOCUMENTS

| | | |
|---|---|---|
| JP | 09-223068 | 8/1997 |
| JP | 2007-257408 | 10/2007 |

(Continued)

OTHER PUBLICATIONS

Yoaz et al. (Speculation Techniques for Improving Load Related Instruction Scheduling, May 1999, pp. 42-53).*

Li et al. (Memory Coloring: A Compiler Approach for Scratchpad Memory Management, Sep. 2005, pp. 329-338).*

*Primary Examiner* — George Giroux

(74) *Attorney, Agent, or Firm* — NSIP Law

(57) ABSTRACT

A processor and a memory management method are provided. The processor includes a processor core, a cache which transceives data to/from the processor core via a single port, and stores the data accessed by the processor core, and a Scratch Pad Memory (SPM) which transceives the data to/from the processor core via at least one of a plurality of multi ports.

21 Claims, 9 Drawing Sheets

(56) References Cited

U.S. PATENT DOCUMENTS

| | | | | |
|---|---|---|---|---|
| 2006/0152983 | A1 | 7/2006 | Johnson et al. | |
| 2007/0157178 | A1* | 7/2007 | Kogan et al. | 717/130 |

FOREIGN PATENT DOCUMENTS

| | | |
|---|---|---|
| KR | 10-2000-0052418 | 8/2000 |
| KR | 10-2004-0054936 | 6/2004 |

* cited by examiner (a) All in the DMQ (b) {D4} in the DMQ

FIG. 5
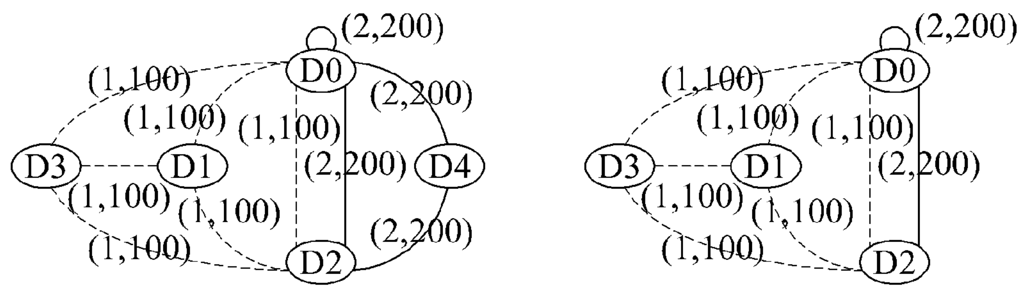
(a) All in the DMQ
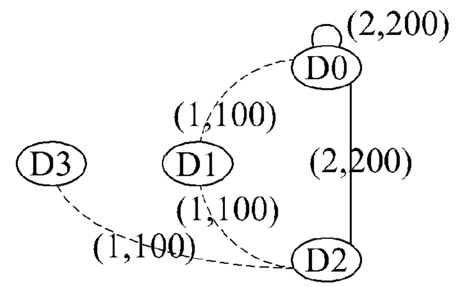
(b) {D4} in the DMQ

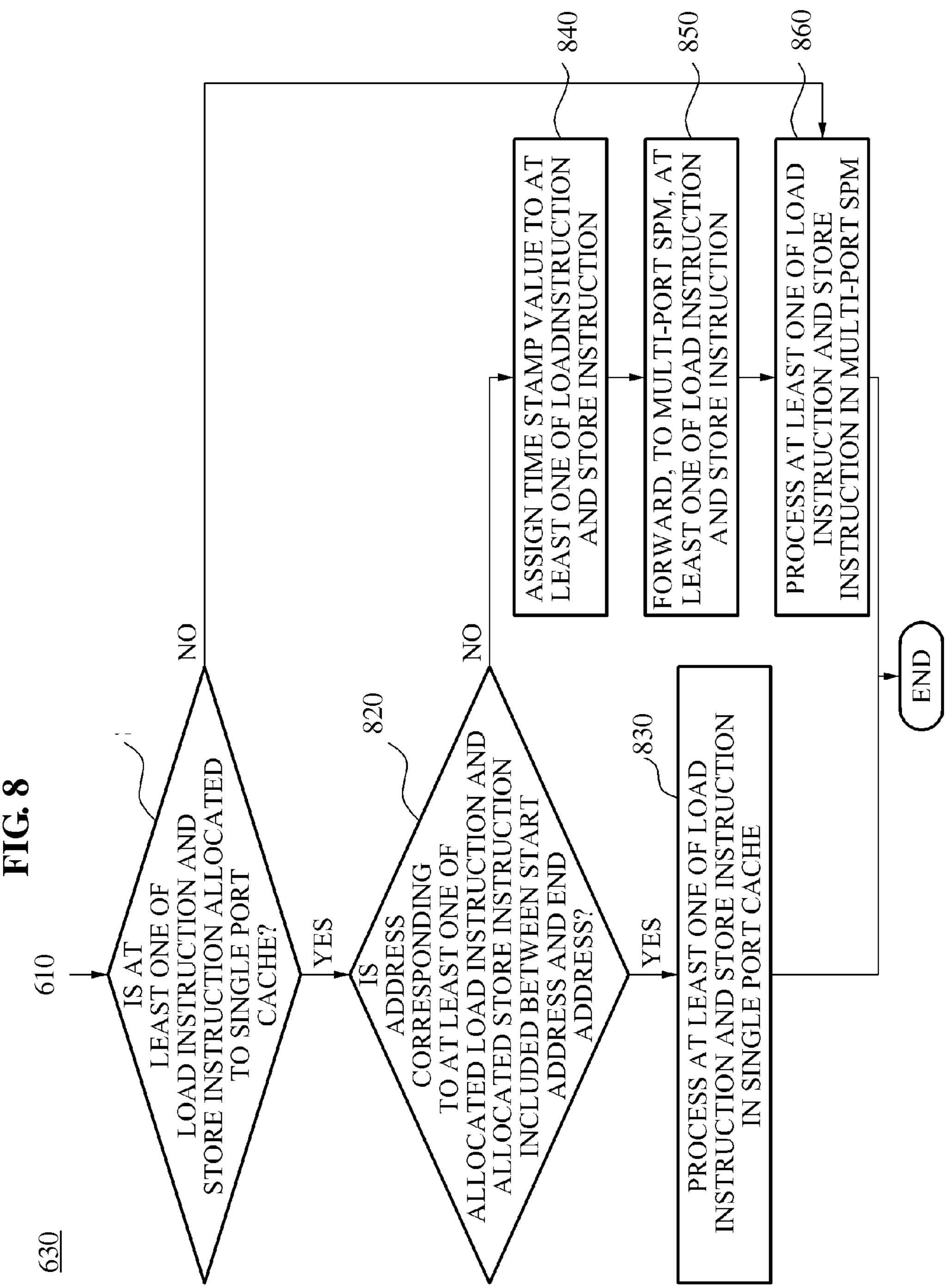
FIG. 8
630
610
IS AT LEAST ONE OF LOAD INSTRUCTION AND STORE INSTRUCTION ALLOCATED TO SINGLE PORT CACHE?
YES
NO
820
IS ADDRESS CORRESPONDING TO AT LEAST ONE OF ALLOCATED LOAD INSTRUCTION AND ALLOCATED STORE INSTRUCTION INCLUDED BETWEEN START ADDRESS AND END ADDRESS?
YES
NO
830
PROCESS AT LEAST ONE OF LOAD INSTRUCTION AND STORE INSTRUCTION IN SINGLE PORT CACHE
840
ASSIGN TIME STAMP VALUE TO AT LEAST ONE OF LOADINSTRUCTION AND STORE INSTRUCTION
850
FORWARD, TO MULTI-PORT SPM, AT LEAST ONE OF LOAD INSTRUCTION AND STORE INSTRUCTION
860
PROCESS AT LEAST ONE OF LOAD INSTRUCTION AND STORE INSTRUCTION IN MULTI-PORT SPM
END

PROCESSOR AND MEMORY CONTROL METHOD FOR ALLOCATING INSTRUCTIONS TO A CACHE AND A SCRATCH PAD MEMORY

CROSS-REFERENCE TO RELATED APPLICATION(S)

This application claims the benefit under 35 U.S.C. §119 (a) of a Korean Patent Application No. 10-2007-0112852, filed on Nov. 6, 2007, in the Korean Intellectual Property Office, and claims the benefit as a continuation-in-part application under 35 U.S.C. §120 of U.S. patent application Ser. No. 12/048,658, filed on Mar. 14, 2008 now U.S. Pat. No. 9,015,451, in the United States Patent and Trademark Office, the entire disclosures of which are incorporated herein by reference.

BACKGROUND

1. Field

The following description relates to a memory configuring a computer, and more particularly, to a memory that may temporarily store data based on a calculation of a processor core.

2. Related Art

A cache memory is provided to more efficiently use memory in a computer system. Typically, it is a memory which is located between a processor core and a main memory, operates more quickly than the main memory, and is smaller than the main memory.

Because data accessed by the processor core generally has a good possibility of being accessed again in the near future, the data accessed by the processor core may be stored in the cache memory and may be quickly accessed when an access request occurs again.

For example, when the data requested by the processor core is stored in the cache memory, the processor core may quickly access the data requested from the cache memory instead of the main memory, thereby reducing an operation time.

As another example, when the data requested by the processor core is not stored in the cache memory, the processor core may need to access the data requested from the main memory instead of the cache memory, and a time required for this process may be longer than a time required for accessing the data from the cache memory.

As described above, a case in which the data requested by the processor core is stored in the cache memory denotes that a cache hit occurs, and a case in which the data requested by the processor core is not stored in the cache memory denotes that a cache miss occurs.

A Scratch Pad Memory (SPM) may be used as a memory device that is combined with the processor core and that stores data.

The SPM may exclude an additional circuit for determining either a hit or a miss, different from that of the cache memory, and is controlled by legacy software for correct operation of the SPM.

Selection, configuration, and use of at least one of a cache and the SPM may be different according to a processor architecture.

Accordingly, there is a need for a processor architecture including a cache and a SPM, enabling more efficient operation of the cache and the SPM, and a memory control method.

SUMMARY

In one general aspect, there is provided a processor including a processor core, a cache which transceives data to/from the processor core via a single port, and stores the data accessed by the processor core, and a Scratch Pad Memory (SPM) which transceives the data to/from the processor core via at least one of a plurality of multi ports.

An instruction executed in the processor core may be allocated to one of the cache and the SPM, and the instruction may comprise at least one of a load instruction and a store instruction.

The processor core may partition accessed data based on the instruction, allocate a portion of the partitioned data to the SPM, and allocate a portion of the remaining partitioned data to the cache.

The processor core may partition the accessed data based on profiling information, a data interference graph, and a size of the SPM.

When it is undetermined during compiling which memory of the cache and the SPM the at least one load instruction and the store instruction executed in the processor core is to be allocated to, the at least one of the load instruction and the store instruction executed in the processor core may be allocated to the cache.

A latency value may be determined based on which of the cache and the SPM each of the load instruction and the store instruction executed in the processor core is allocated to, and each of the allocated load instruction and the allocated store instruction may be scheduled based on the determined latency value.

The SPM may assign a time stamp value to each of the load instruction and the store instruction allocated to the SPM, and reduce, by one, the time stamp value for each clock cycle.

The cache may select any one of the load instruction and the store instruction to be forwarded to the SPM based on an address indicated by each of the load instruction and the store instruction allocated to the cache, assign a time stamp value to each of the selected load instruction and the selected store instruction, and forward, to the SPM, each of the load instruction and the store instruction to which the time stamp value is assigned.

A latency of the cache may be less than a latency of the SPM.

The SPM may comprise an input queue memory which stores, using a First In First Output (FIFO) scheme, at least one of a load instruction and a store instruction requested by the processor core; and an output buffer which outputs a processing result of each of the load instruction and the store instruction processed by the SPM based on a latency of each of the processed load instruction and the processed store instruction.

The output buffer may output the processing result according to a sequence in which a time stamp value of each of the processed load instruction and the processed store instruction is 0.

When a time stamp value of each of the requested load instruction and the requested store instruction is predicted to be 0 while processing each of the requested load instruction and the requested store instruction, the SPM may transmit a stall order to the processor core.

In another aspect, there is provided a memory control method of a processor including a processor core, a single port cache, and a multi-port SPM, the method including analyzing a characteristic of at least one of a load instruction and a store instruction executed in the processor core, allocating the at least one of the load instruction and the store instruction to any one of the single port cache and the multi-port SPM based on the analyzed characteristic, and processing the at least one of the allocated load instruction and the allocated store instruction.

The processing may comprise assigning a time stamp value to the at least one of the allocated load instruction and the allocated store instruction when the at least one of the load instruction and the store instruction is allocated to the multi-port SPM, reducing, by one, the time stamp value for each clock cycle, and outputting a processing result of the at least one of the load instruction and the store instruction when the time stamp value is 0.

The processing may comprise selecting any one of the load instruction and the store instruction to be forwarded to the multi-port SPM based on an address corresponding to the at least one of the allocated load instruction and the allocated store instruction, and assigning a time stamp value to either the selected load instruction or the selected store instruction.

The selecting may comprise setting a start address and an end address of the single port cache, and determining whether to forward, to the multi-port SPM, the at least one of the allocated load instruction and the allocated store instruction by comparing the address corresponding to the at least one of the allocated load instruction and the allocated store instruction with the start address and the end address.

The multi-port SPM may include an output buffer and an input queue memory of an FIFO scheme, and the processing may comprise storing, in the input queue memory, the at least one of the allocated load instruction and the allocated store instruction according to a scheduling-determined sequence, processing the at least one of the load instruction and the store instruction that is first stored in the input queue memory, storing, in the output buffer, a processing result value of the at least one of the processed load instruction and the processed store instruction, and outputting the processing result value stored in the output buffer when a time stamp value of the at least one of the processed load instruction and the processed store instruction is 0.

The processing of the at least one of the allocated load instruction and the allocated store instruction may further comprise transmitting a stall order to the processor core when a time stamp value of the at least one of the first-stored load instruction and the first-stored store instruction is predicted to be 0 while an operation of processing the at least one of the load instruction and the store instruction being first stored in the input queue memory is performed.

When it is undetermined during compiling which memory of the cache and the SPM the at least one load instruction and the store instruction is allocated to, the allocating may allocate the at least one of the load instruction and the store instruction to the cache.

In another aspect, there is provided a computer-readable storage medium having stored therein program instructions for implementing a memory control method of a processor including a processor core, a single port cache, and a multi-port SPM, the method including analyzing a characteristic of at least one of a load instruction and a store instruction executed in the processor core, allocating the at least one of the load instruction and the store instruction to any one of the single port cache and the multi-port SPM based on the analyzed characteristic, and processing the at least one of the allocated load instruction and the allocated store instruction.

Other features may be apparent from the following detailed description, the drawings, and the claims.

BRIEF DESCRIPTION OF THE DRAWINGS

FIG. 5 is a diagram is a diagram illustrating a data interference graph based on FIG. 4.

FIG. 8 is a flowchart illustrating another example of operation 630 of FIG. 4.

Figure 1:
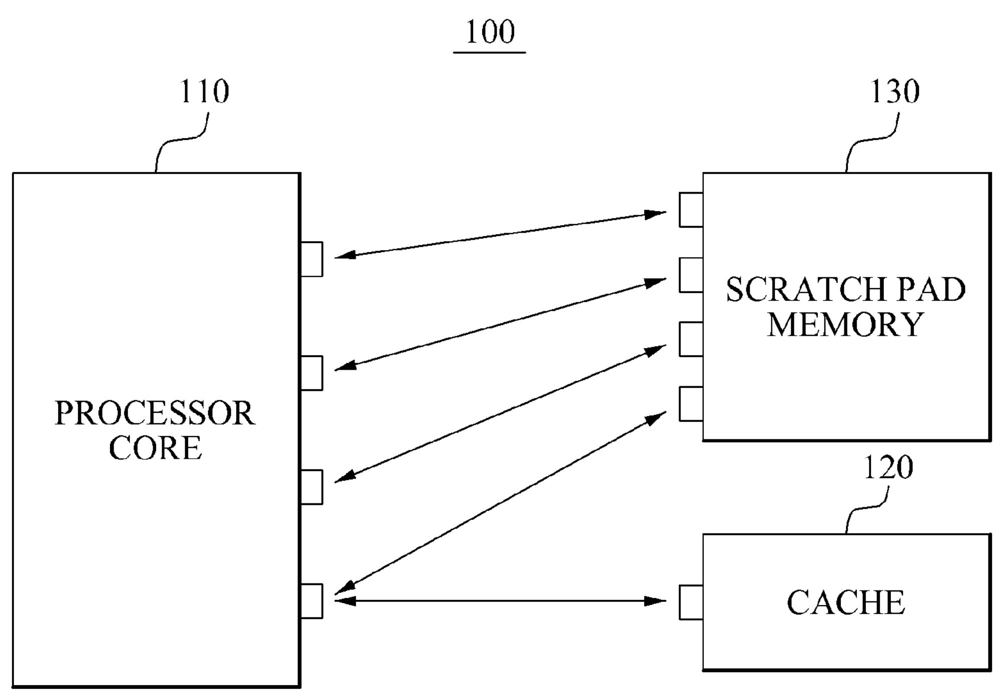
FIG. 1 is a diagram illustrating an example of a processor.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods and apparatuses described herein. Accordingly, various changes, modifications, and equivalents of the apparatuses and methods described herein may be suggested to those of ordinary skill in the art. Also, descriptions of well-known functions and constructions may be omitted for increased clarity and conciseness.

According to various aspects, there is provided a hardware and/or software method and apparatus for efficiently operating a data memory of a hybrid form. According to various aspects, suitable operation of the data memory of the hybrid form may be performed with reduced complexity.

In order to increase an instruction processing speed of a processor, a processor architecture may simultaneously process a plurality of instructions in parallel. At least one of a load instruction and a store instruction may be processed in parallel in a parallel processor. Accordingly, the parallel processor may include a plurality of units processing the at least one of the load instruction and the store instruction, and a memory apparatus may include a plurality of ports for processing a plurality of load instructions and/or a plurality of store instructions in parallel.

According to various aspects, there is provided a processor and a memory which efficiently process data via a combination of a multi-port memory and a single port memory.

A cache memory may be utilized for efficiently using a memory in a computer. The cache memory may be located between a processor core and a main memory, may operate more quickly than the main memory, and may be smaller than the main memory.

The data accessed by the processor core generally has a strong possibility of being accessed again soon. Accordingly, the data accessed by the processor core may be stored in the cache memory and may be quickly accessed when an access request occurs again.

In this example, when the data requested by the processor core is stored in the cache memory, the processor core may quickly access the data requested from the cache memory instead of the main memory, thereby reducing an operation time.

The cache memory may include a tag memory storing a portion of an address on the main memory of the stored data.

Because the cache memory has a complex configuration in a hardware aspect, the cache memory may be inappropriate as the multi-port memory. Also, because a policy of eviction may not be easily determined when a cache miss is generated in a specific port, the cache memory may be inappropriate as the multi-port memory. Accordingly, a processor architecture using a single port cache memory is proposed.

A Scratch Pad Memory (SPM) may be provided as well as the cache memory as a memory architecture storing the data processed by the processor. Because the SPM has a simple hardware configuration, the SPM may be appropriate as the multi-port memory. Because the SPM excludes an internal control circuit and the like, control of the SPM may be performed via software. The software may be used to determine scheduling of the SPM, manage the SPM, and store data in the SPM in order to store the data at runtime in the SPM.

Also, because a multi-port SPM may have architecture more complex than a single port SPM, the multi-port SPM may take a relatively longer time for processing the data. Accordingly, a data latency of the multi-port SPM may be high.

A high data latency may or may not be permitted based on a type of instructions executed in the processor.

Also, the at least one of the load instruction and the store instruction may not always need to be processed in parallel in the parallel processor. Accordingly, a single port cache having a low data latency may be more efficient than the multi-port SPM having the high data latency based on a characteristic of the at least one of the load instruction and the store instruction.

For suitably controlling the single port cache memory and the multi-port SPM, there is provided a processor and a memory system including the single port cache memory and the multi-port SPM, and a memory management method. Also, there is provided a method for enhancing system performance by partitioning data accessed by a processor core based on an instruction, and by allocating the partitioned data to a cache or an SMP.

According to various aspects, there is provided a memory management method for controlling each of the single port cache memory and the multi-port SPM based on a latency of each of the single port cache memory and the multi-port SPM.

FIG. 1 illustrates an example of a processor.

Referring to FIG. 1, processor 100 includes a processor core 110, a cache 120, and an SPM 130.

The processor core 110 may process a plurality of instructions in parallel.

The cache 120 may transceiver data to/from the processor core 110 via a single port, and store the data accessed by the processor core 110.

The SPM 130 includes a plurality of multi ports, and may transceiver the data to/from the processor core 110 via any one of the plurality of multi ports.

At least one of a load instruction and a store instruction executed in the processor core 110 is allocated to any one of the cache 120 and the SPM 130.

For example, a compiler may allocate the at least one load instruction and store instruction to any one of the cache 120 and the SPM 130. The compiler may analyze a characteristic of the at least one of the load instruction and the store instruction, and allocate the at least one of the load instruction and the store instruction to any one of the cache 120 and the SPM 130 based on the analyzed characteristic.

The processor core 110 may partition accessed data based on the load instruction or the store instruction.

For example, the processor core 110 may partition the accessed data, and allocate a portion of the partitioned data to the SPM 130, and a portion of remaining partitioned data to the cache 120.

For example, the processor core 110 may profile a program in order to obtain an execution count of each configuration and a data closure of each of the load instruction and the store instruction.

The processor core 110 may identify maximal data closures based on profiling information, and may generate a data interference graph with respect to all the configurations.

A data closure with respect to an instruction is defined in a set of data.

The processor core 110 may enlist all the combinations of the maximal data closures, and may find a set of combinations with a size less than or equal to a size N of the SPM 130.

Using the data interference graph, the processor core 110 may find, from all the combinations of the maximal data closures, a combination that may minimally increase a sum of execution counts of extra configurations, and may determine a combination of remaining data closures and the found combination.

The found combination that may minimally increase the sum of executions counts of extra configurations may be allocated to the SPM 130. The set of remaining data closures in the set of combinations with the size less than or equal to the size N of the SPM 130 may be allocated to the cache 120.

When it is undetermined during compiling which memory of the cache 120 and the SPM 130 the at least one of the load instruction and the store instruction executed in the processor core 110 will be allocated to, the at least one of the load instruction and the store instruction may be allocated to the cache 120.

For example, if it is undetermined which memory the at least one of the load instruction and the store instruction are to be allocated to, the compiler may allocate the at least one of the load instruction and the store instruction to the cache 120.

For example, the compiler may determine a latency value of each of the allocated load instruction and the allocated store instruction based on which of the cache 120 and the SPM 130 each of the load instruction and the store instruction is allocated to.

The cache 120 having a single port has a latency lower than the SPM 130 having a multi port. For purposes of example, a latency of the cache 120 may be one, and a latency of the SPM 130 may be four. In this example, the at least one of the load instruction and the store instruction allocated to the cache 120 has the latency of one, and the at least one of the load instruction and the store instruction allocated to the SPM 130 has the latency of four.

The compiler may determine scheduling of each of the allocated load instruction and the allocated store instruction based on the determined latency value.

The SPM 130 may assign a time stamp value to each of the load instruction and the store instruction allocated to the SPM 130, and may reduce, by one, the time stamp value for each clock cycle.

The cache 120 may select any one of the load instruction and the store instruction to be forwarded to the SPM 130 based on an address indicated by each of the load instruction and the store instruction allocated to the cache 120. The cache 120 may assign a time stamp value to each of the selected load instruction and the selected store instruction, and forward, to the SPM 130, each of the load instruction and the store instruction to which the time stamp value is assigned.

In this example, the cache 120 may compare the address indicated by each of the load instruction and the store instruction with a predetermined start address and a predetermined end address. When the address indicated by each of the load instruction and the store instruction is not included between the start address and the end address, the cache 120 may forward the at least one of the load instruction and the store instruction to the SPM 130.

Figure 2:
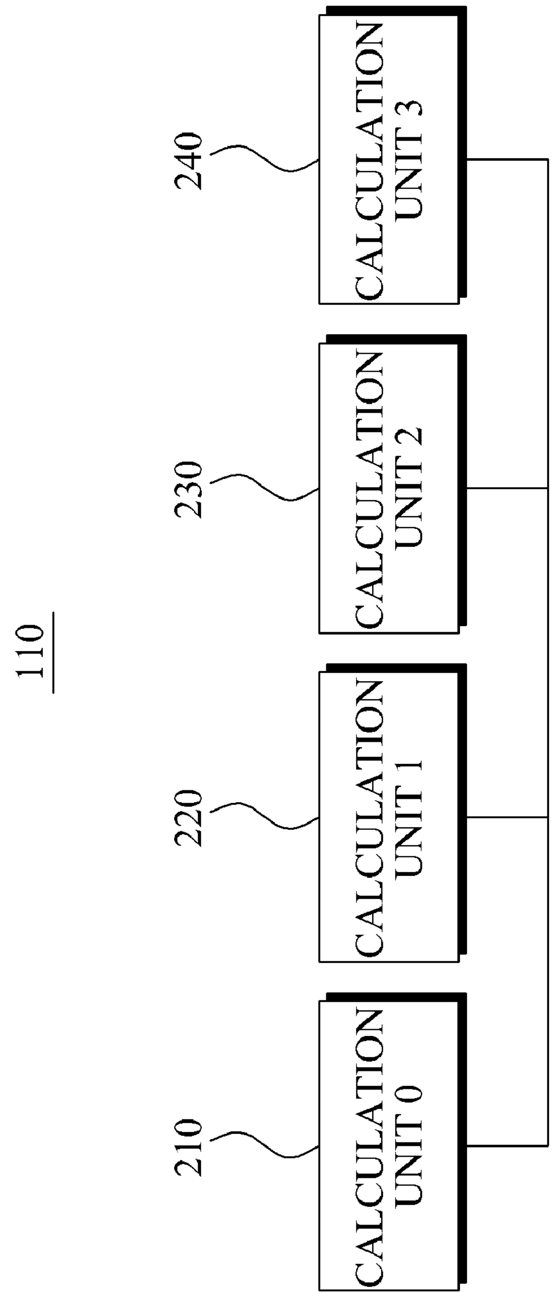
FIG. 2 is a diagram illustrating an example of a processor core of FIG. 1.

FIG. 2 illustrates an example of the processor core 110 of FIG. 1.

Referring to FIG. 2, the processor core 110 includes four calculation units 210, 220, 230, and 240.

Each of the calculation units 210, 220, 230, and 240 may execute an instruction in parallel. Because the processor core 110 includes the four calculation units, the processor core 110 may execute four instructions in parallel.

The processor core 110 may execute four load instructions or four store instructions, and the processor core 110 may use four ports.

Figure 3:
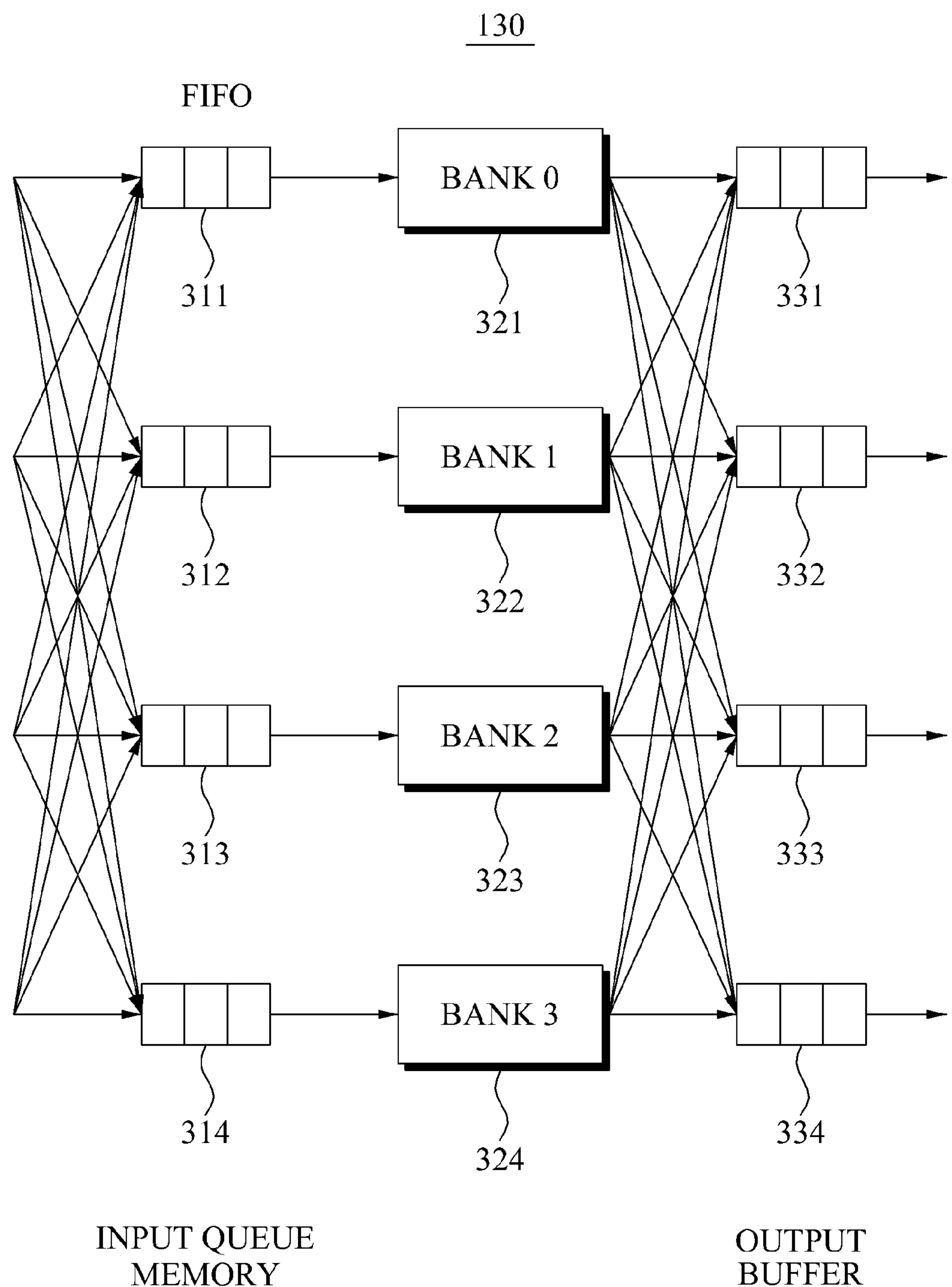
FIG. 3 is a diagram illustrating an example of a Scratch Pad Memory (SPM) of FIG. 1.

FIG. 3 illustrates an example of the SPM 130 of FIG. 1.

Referring to FIG. 3, the SPM 130 includes four memory banks (0 through 3) 321, 322, 323, and 324. The memory bank (0) 321 is connected with an input queue memory 311 and an output buffer 331.

The input queue memory 311 stores and outputs, using a First In First Out (FIFO) scheme, at least one of a load instruction and a store instruction requested by the processor core 110.

The memory bank (0) 321 processes the at least one of the load instruction and the store instruction received from the input queue memory 311, and forwards a processing result to the output buffer 331.

The output buffer 331 outputs the processing result of the at least processed load instruction and the processed store instruction. The output buffer 331 outputs the processing result based on a latency of each of the processed load instruction and the processed store instruction.

The output buffer 331 outputs the processing result according to a sequence in which a time stamp value of each of the processed load instruction and the processed store instruction is 0.

Similarly, the input queue memories 312, 313, and 314 store and output the at least one of the load instruction and the store instruction requested by the processor core 110 using the FIFO scheme.

The memory bank (1) 322 processes at least one load instruction and the store instruction received from the input queue memory 312, and forwards the processing result to the output buffer 332. The memory bank (2) 323 processes at least one load instruction and the store instruction received from the input queue memory 313, and forwards a processing result to the output buffer 333. The memory bank (3) 324 processes at least one load instruction and the store instruction received from the input queue memory 314, and forwards a processing result to the output buffer 334.

When a time stamp value of each of the requested load instruction and the requested store instruction is predicted to be 0 while processing each of the requested load instruction and the requested store instruction, the SPM 130 may transmit a stall order to the processor core 110. For example, when the processing result is not expected to reach the processor core 110 until the time stamp value of each of the requested load instruction and the requested store instruction is 0 while the SPM 130 processes each of the requested load instruction and the requested store instruction, the SPM 130 may transmit the stall order to the processor core 110.

For example, when the time stamp value is 1 while each of the load instruction and the store instruction is waiting in the input queue memories 311, 312, 313, and 314, the SPM 130 may transmit the stall order to the processor core 110.

Also, when the time stamp value is 0 while each of the load instruction and the store instruction is processed in the memory banks (0 through 3) 321, 322, 323, and 324, the SPM 130 may transmit the stall order to the processor core 110.

The SPM 130 may transmit the stall order to the processor core 110 based on the time stamp value of each of the load instruction and the store instruction and an architecture of the SPM 130.

In various aspects, a time for determining when the SPM 130 transmits the stall order may be a time when each of the load instruction and the store instruction is located in the input queue memories 311, 312, 313, and 314, or may be a time when each of the load instruction and the store instruction is processed in the memory banks (0 through 3) 321, 322, 323, and 324, or may be a time when the output buffers 331, 332, 333, and 334 output the processing results.

When the processor core 110 receives the stall order, the processor core 110 waits, stopping an operation until the processing result of each of the load instruction and the store instruction is received.

In various aspects, a number of memory banks may be different from a number of ports. The number of memory banks may be greater than or equal to the number of ports.

Figure 4:
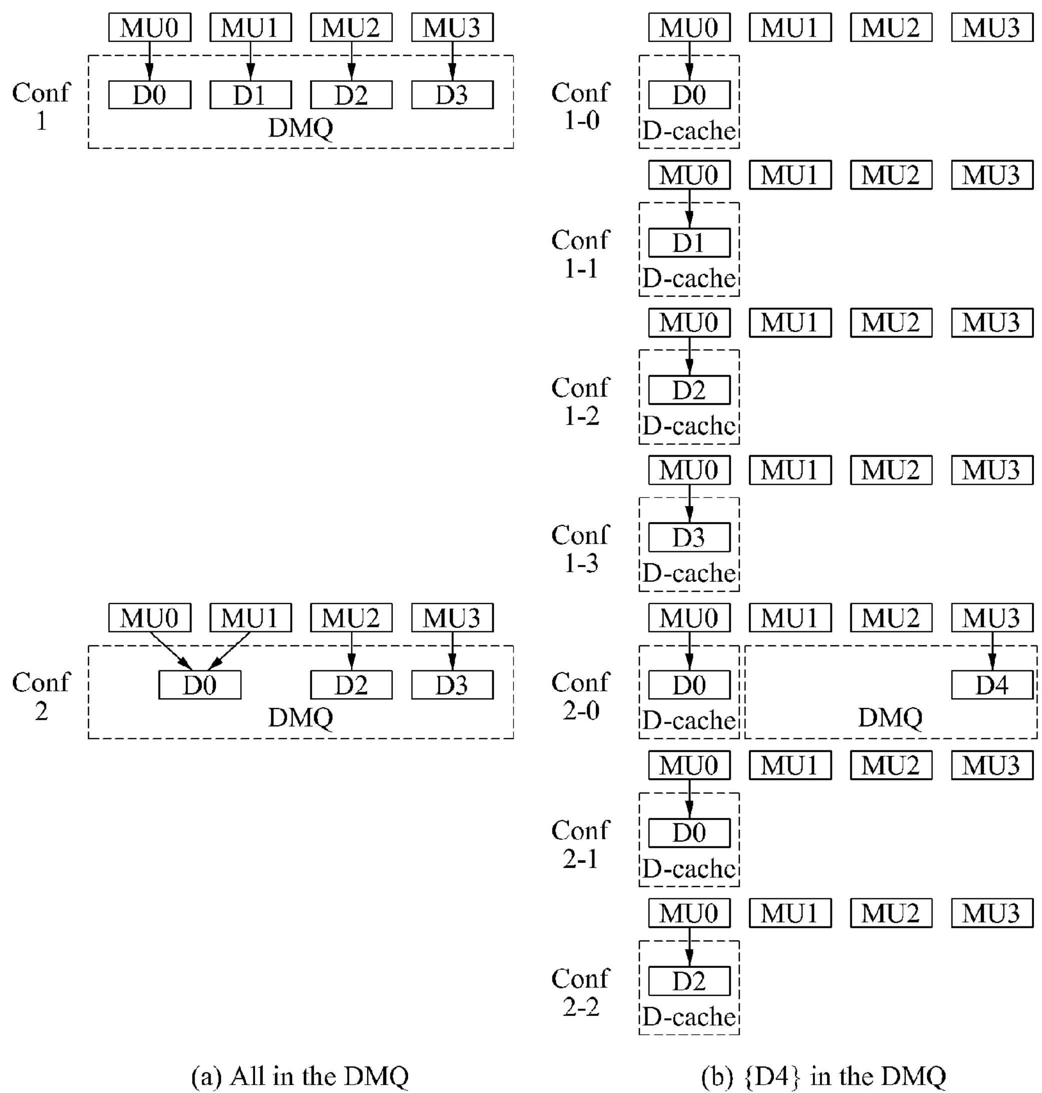
FIG. 4 is a diagram illustrating an example of a relationship between partitioned data and a calculation unit.

FIG. 4 illustrates an example of a relationship between partitioned data and a calculation unit, and FIG. 5 illustrates an example of a data interference graph based on FIG. 4.

As described above, the processor core 110 may partition accessed data based on a characteristic, for example, a latency, and the like, of a load instruction or a store instruction.

The processor core 110 may partition the accessed data based on profiling information used for profiling of a program, a data interference graph, a size of the SPM 130, and the like.

A data closer and the SPM 130 of FIG. 4 may be defined as follows:

Size of SPM: 10

Sizes of data closers: D0=10, D1=12, D2=5, D3=5, D4=10

A sum of sizes of data closers allocated to the SPM 130 may need to be within the size of the SPM 130.

According to the above definition, combinations of data closures assignable to the SPM 130 may be determined as follows.

Combinations of data closures: {D2, D3}, {D0}, {D4}, {D2}, {D3}

Arrow indicators may indicate relationships between calculation units MU0, MU1, MU2, and MU3 and data closures D0, D1, D2, D3, and D4.

A right diagram (b) of FIG. 4 shows an example of scheduling, to the SPM 130, only {D4} among the combinations of the data closures.

As shown in FIG. 5, the processor core 110 may generate the data interference graph with respect to all the configurations of the program, and may determine all the combinations of identified maximal data closures.

The processor core 110 may find a combination that may minimally decrease a sum of execution counts of extra configurations by finding a set of combinations with a size less than the size N of the SPM 130 from the determined all the combinations, and by decreasing a right diagram (b) of FIG. 5 and the data interference graph.

Accordingly, the processor 110 may allocate the data to at least one of the cache 120 and the SPM 130 by partitioning the data into the found combination that may minimally increase the sum of execution counts of extra configuration, and a set of remaining data closures in the set of combinations with the size less than the size N of the SPM 130.

Figure 6:
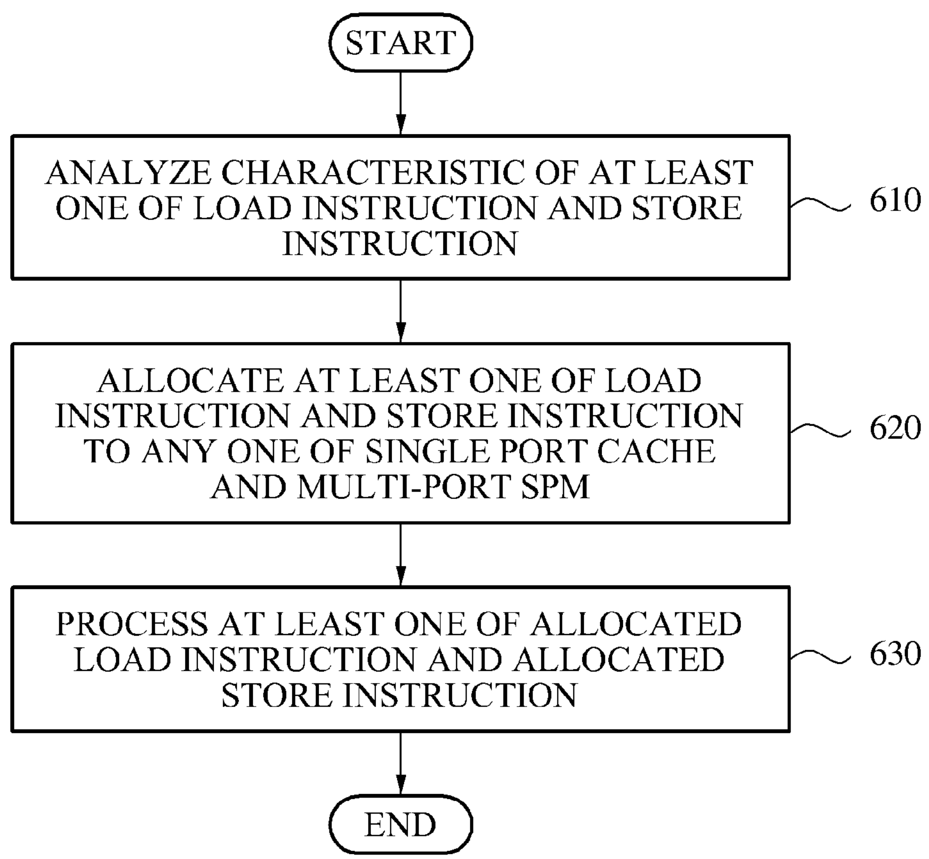
FIG. 6 is a flowchart illustrating a memory management method of the processor.

FIG. 6 illustrates an example of a memory management method of the processor 100 of FIG. 1.

Referring to FIG. 6, in 610, the memory management method analyzes a characteristic of at least one of a load instruction and a store instruction executed in the processor core 110.

In 620, the memory management method allocates the at least one of the load instruction and the store instruction to any one of the cache 120 and the SPM 130 based on the analyzed characteristic.

In 630, the memory management method processes the at least one of the allocated load instruction and the allocated store instruction.

The cache 120 is a single port memory, and the SPM 130 is a multi-port memory. The cache 120 may have a latency lower than a latency of the SPM 130. The memory management method may determine the characteristic of the at least one of the load instruction and the store instruction based on whether a high latency is permitted.

The memory management method may classify the at least one of the load instruction and the store instruction into at least one of a quick load instruction and a quick store instruction based on the analyzed characteristic, and process the at least one of the load instruction and the store instruction. The memory management method may allocate the at least one of the quick load instruction and the quick store instruction to the cache 120.

When the characteristic of the at least one of the load instruction and the store instruction may not be analyzed, the memory management method may temporarily classify the at least one of the load instruction and the store instruction into the at least one of the quick load instruction and the quick store instruction.

For example, the memory management method may use a pointer analysis scheme to analyze the characteristic of the at least one of the load instruction and the store instruction. The pointer analysis scheme is a scheme of analyzing the characteristic of each of the load instruction and the store instruction by tracking a pointer of each of the load instruction and the store instruction and tracing an available path in advance.

Figure 7:
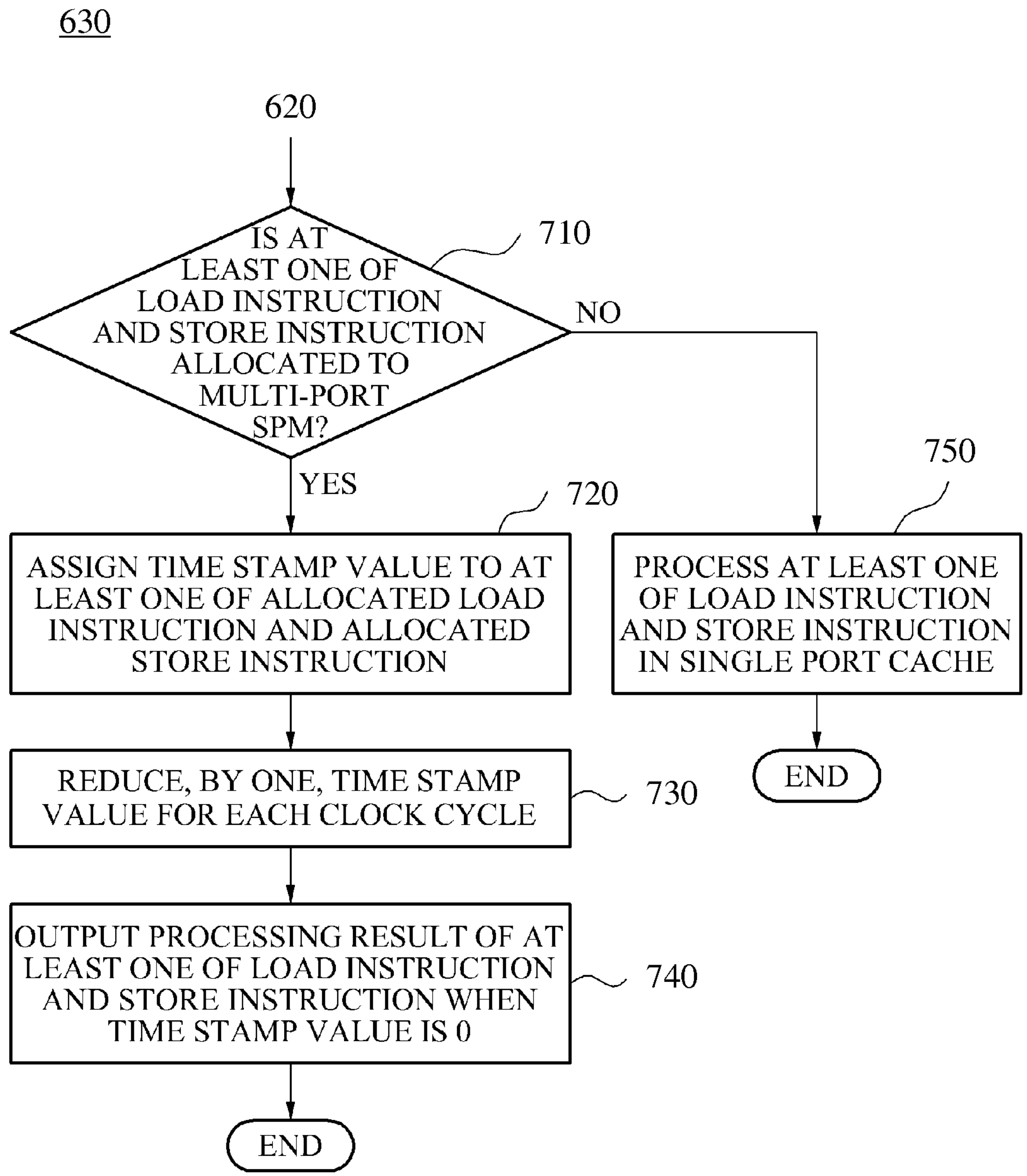
FIG. 7 is a flowchart illustrating an example of operation 630 of FIG. 4.

FIG. 7 illustrates an example of operation 630 of FIG. 6.

Referring to FIG. 7, in 710, whether at least one of a load instruction and a store instruction is allocated to the SPM 130 is determined.

In 720, a time stamp value is assigned to the at least one of the allocated load instruction and the allocated store instruction when the at least one of the load instruction and the store instruction is allocated to the SPM 130.

In 730, the assigned time stamp value is reduced, by one, for each clock cycle.

In 740, a processing result of the at least one of the load instruction and the store instruction is outputted when the time stamp value is 0.

In 750, the at least one of the allocated load instruction and the allocated store instruction is processed in the cache 120 when the at least one of the load instruction and the store instruction is allocated to the cache 120.

FIG. 8 illustrates another example of operation 630 of FIG. 6.

Referring to FIG. 8, in 810, whether at least one of a load instruction and a store instruction is allocated to the cache 120 is determined.

In 820, when the at least one of the load instruction and the store instruction is allocated to the cache 120, whether an address corresponding to the at least one of the allocated load instruction and the allocated store instruction is included between a start address and an end address is determined.

In 820, whether to forward, to the SPM 130, the at least one of the load instruction and the store instruction is determined based on whether the address is included between the start address and the end address.

In 820, the start address and the end address of the cache 120 may be set. For example, the start address and the end address of the cache 120 may be set in advance.

In 830, when the address is included between the start address and the end address, the at least one of the load instruction and the store instruction is processed in the cache 120.

In 630, when the address is not included between the start address and the end address, the at least one of the load instruction and the store instruction may be determined to be forwarded to the SPM 130.

In 840, when the address is not included between the start address and the end address, a time stamp value is assigned to the at least one of the load instruction and the store instruction.

In 850, the at least one of the load instruction and the store instruction to which the time stamp value is assigned is forwarded to the SPM 130.

After 850, or when it is determined that the at least one of the load instruction and the store instruction is not allocated to the cache 120 in 810, the at least one of the load instruction and the store instruction forwarded to the SPM 130 is processed in the SPM 130, in 860.

For example, in operation 630, the at least one of the allocated load instruction and the allocated store instruction may be stored in any one of the input queue memories 311, 312, 313, and 314 according to a scheduling-determined sequence.

In operation 630, the at least one of the load instruction and the store instruction first stored in the input queue memories 311, 312, 313, and 314 may be processed.

In operation 630, a processing result value of the at least one of the processed load instruction and the processed store instruction may be stored in any one of the output buffers 331, 332, 333, and 334.

In operation 630, the processing result value stored in the output buffers 331, 332, 333, and 334 may be outputted when a time stamp value of the at least one of the processed load instruction and the processed store instruction is 0.

In operation 630, a stall order may be transmitted to the processor core 110 when a time stamp value of the at least one of the first-stored load instruction and the first-stored store instruction is predicted to be 0 while processing the at least one of the first-stored load instruction and the first-stored store instruction.

For example, in operation 630, the stall order may be transmitted to the processor core 110 when the processing result is expected not to reach the processor core 110 until the time stamp value of each of the first-stored load instruction and the first-stored store instruction is 0 while processing each of the first-stored load instruction and the first-stored store instruction.

For example, when the time stamp value is 1 while each of the load instruction and the store instruction is waiting in the input queue memories 311, 312, 313, and 314, the stall order may be transmitted to the processor core 110 in operation S630.

Also, when the time stamp value is 0 while each of the load instruction and the store instruction is processed in the memory banks (0 through 3) 321, 322, 323, and 324, the stall order may be transmitted to the processor core 110 in operation S630.

In operation 630, the stall order may be transmitted to the processor core 110 based on the time stamp value of each of the load instruction and the store instruction and an architecture of the SPM 130.

According to various aspects, a time for determining when the stall order is transmitted in operation 630 may be a time when each of the load instruction and the store instruction is located in the input queue memories 311, 312, 313, and 314, or may be a time when each of the load instruction and the store instruction is processed in the memory banks (0 through 3) 321, 322, 323, and 324, or may be a time when the output buffers 331, 332, 333, and 334 output the processing results.

When the processor core 110 receives the stall order, the processor core 110 waits, stopping an operation until the processing result of each of the load instruction and the store instruction is received.

Figure 9:
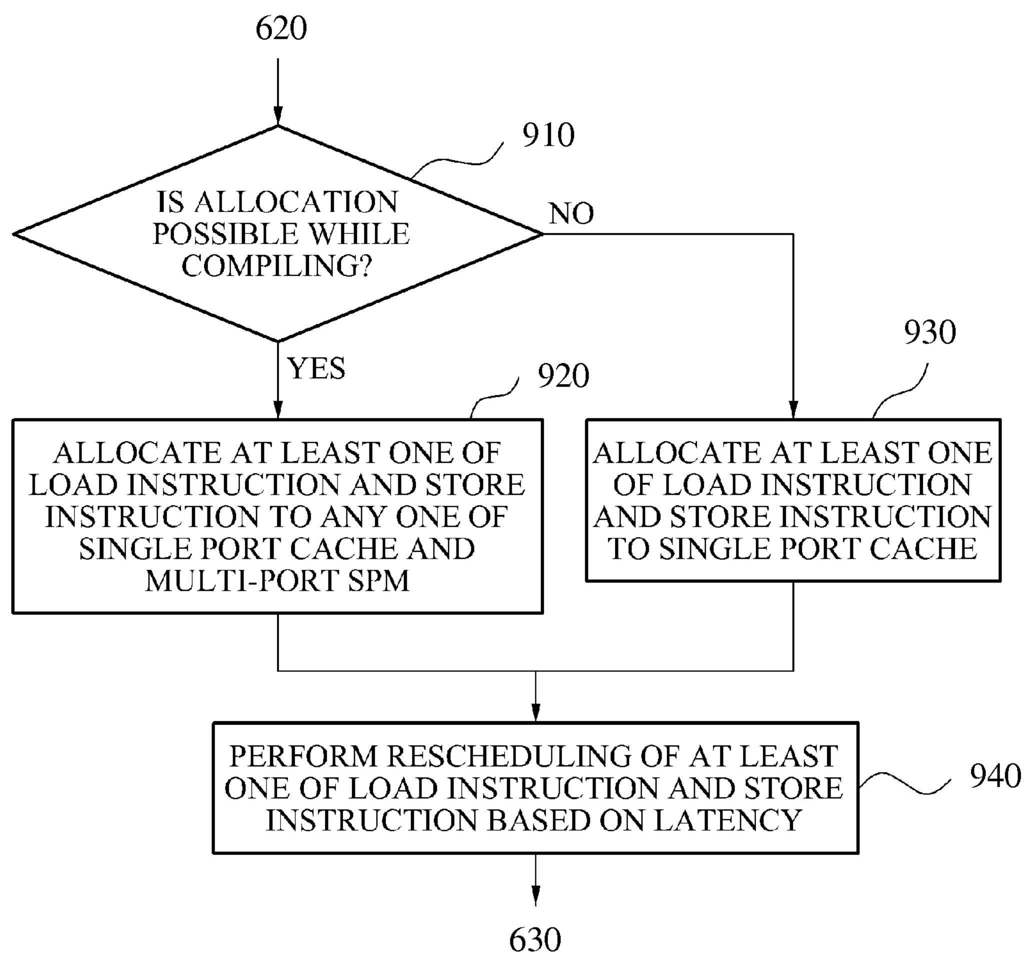
FIG. 9 is a flowchart illustrating another example of a memory management method of a processor.

FIG. 9 illustrates another example of a memory management method of the processor 100 of FIG. 1.

Referring to FIG. 9, in 910, the memory management method determines whether allocation of at least one of a load instruction and a store instruction is possible while compiling after performing operation 620.

In 920, when it is determined in 910 that allocation is possible, the memory management method allocates the at least one of the load instruction and the store instruction to any one of the cache 120 and the SPM 130 based on an allocation result of operation 620.

In 930, when it is determined in 910 that allocation is not possible, the memory management method allocates the at least one of the load instruction and the store instruction to the cache 120.

In 940, the memory management method performs rescheduling of the at least one of the allocated load instruction and the allocated store instruction based on a latency.

In this example, because a latency of the cache 120 is lower than a latency of the SPM 130, the at least one of the load instruction and the store instruction allocated to the cache 120 may be executed more quickly than the at least one of the load instruction and the store instruction allocated to the SPM 130.

According to various aspects, there is provided a processor architecture enabling correct operation in a memory system including a cache and a Scratch Pad Memory (SPM).

According to various aspects, there is provided a processor architecture including a hybrid memory appropriate for a computer architecture in which processing of multiple load/store operations is performed.

According to various aspects, there is provided a processor including a processor core, a cache which transceives data to/from the processor core via a single port, and stores the data accessed by the processor core, and an SPM which transceives the data to/from the processor core via at least one of a plurality of multi ports.

According to various aspects, there is provided a memory control method of a processor including a processor core, a single port cache, and a multi-port SPM. The method includes analyzing a characteristic of at least one of a load instruction and a store instruction executed in the processor core, allocating the at least one of the load instruction and the store instruction to any one of the single port cache and the multi-port SPM based on the analyzed characteristic, and processing the at least one of the allocated load instruction and the allocated store instruction.

The processes, functions, methods, and/or software described herein may be recorded, stored, or fixed in one or more computer-readable storage media including program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the methods and operations described herein, or vice-versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A processor comprising:

a processor core for processing an instruction;

a cache configured to transceive data to/from the processor core via a single port, and store data accessed by the processor core; and a Scratch Pad Memory (SPM) configured to transceive data to/from the processor core via at least one port from among a plurality of ports, wherein an instruction executed in the processor core is allocated to one of the cache and the SPM, and the instruction comprises at least one of a load instruction and a store instruction, wherein the processor core profiles a program to obtain an execution count of each configuration of the load instruction and the store instruction, and a data closure of the load instruction and the store instruction;

wherein the processor core searches for, from among all combinations of maximal data closures of each of the load instructions and the store instructions, a combination that increases a sum of execution counts of extra configurations, wherein the processor core further determines a combination of remaining data closures and the found combination, allocates the found combination to the SPM, and allocates the set of remaining data closures to the cache, and wherein the processor core partitions the accessed data based on profiling information, a data interference graph, and a size of the SPM.

2. The processor of claim 1, wherein the processor core partitions accessed data based on the instruction, allocates a portion of the partitioned data to the SPM, and allocates a portion of the remaining partitioned data to the cache.

3. The processor of claim 1, wherein, in response to it being undetermined during compiling which memory of the cache and the SPM the instruction executed in the processor core is to be allocated to, the instruction is allocated to the cache.

4. The processor of claim 1, wherein a latency value is determined based on which of the cache and the SPM the instruction executed in the processor core is allocated to, and the allocated instruction is scheduled based on the determined latency value.

5. The processor of claim 1, wherein the SPM assigns a time stamp value to an instruction allocated to the SPM, and reduces, by one, the time stamp value for each clock cycle.

6. The processor of claim 1, wherein the cache selects an instruction to be forwarded to the SPM based on an address indicated by an instruction allocated to the cache, assigns a time stamp value to the selected instruction, and forwards, to the SPM, the selected instruction to which the time stamp value is assigned.

7. The processor of claim 1, wherein a latency of the cache is less than a latency of the SPM.

8. The processor of claim 1, wherein the SPM comprises:

an input queue memory which stores, using a First In First Output (FIFO) scheme, an instruction requested by the processor core; and an output buffer which outputs a processing result of the instruction processed by the SPM based on a latency of the processed instruction.

9. The processor of claim 8, wherein the output buffer outputs the processing result according to a sequence, in response to a time stamp value of the processed instruction being 0.

10. The processor of claim 8, wherein, in response to a time stamp value of the requested instruction being predicted to being 0 while processing the requested instruction, the SPM transmits a stall order to the processor core.

11. The processor of claim 1, wherein the profiling information comprises a relationship between a plurality of calculation units of the processor core mapped to a plurality of data closures of the program.

12. The processor of claim 1, wherein the data interference graph is based on the execution count of each configuration of the load instruction and the store instruction, and the data closure of each of the load instruction and the store instruction.

13. The processor of claim 1, further comprising a compiler configured for allocating the load instruction and the store instruction to the cache in response to a determination that the load instruction and the store instruction is not allocated.

14. A memory control method of a processor including a processor core, a single port cache, and a multi-port Scratch Pad Memory (SPM), the method comprising:

analyzing a characteristic of an instruction executed in the processor core, the instruction comprising at least one of a load instruction and a store instruction;

allocating the instruction to one of the single port cache and the multi-port SPM based on the analyzed characteristic; and processing the allocated instruction, wherein the processing comprises:

profiling a program to obtain an execution count of each configuration of the load instruction and the store instruction, and a data closure of each of the load instruction and the store instruction, searching for, from among all combinations of maximal data closures of each of the load instructions and the store instructions, a combination that increases a sum of execution counts of extra configurations, determining a combination of remaining data closures and the found combination, allocating the found combination to the SPM, and allocating the set of remaining data closures to the cache, and wherein the processor core partitions accessed data based on the characteristic such that the characteristic includes profiling information, a data interference graph, and a size of the SPM.

15. The method of claim 14, wherein the processing comprises:

assigning a time stamp value to the allocated instruction in response to the instruction being allocated to the multi-port SPM;

reducing, by one, the time stamp value for each clock cycle; and outputting a processing result of the instruction in response to the time stamp value being 0.

16. The method of claim 14, wherein the processing comprises:

selecting an instruction to be forwarded from the single port cache to the multi-port SPM based on an address of the allocated instruction; and assigning a time stamp value to the selected instruction.

17. The method of claim 16, wherein the selecting comprises:

setting a start address and an end address of the single port cache; and determining whether to forward, to the multi-port SPM, the allocated instruction by comparing the address corresponding to the allocated instruction with the start address and the end address.

18. The method of claim 14, wherein the multi-port SPM includes an output buffer and an input queue memory of a FIFO scheme, and the processing comprises:

storing, in the input queue memory, the allocated instruction according to a scheduling-determined sequence;

processing the instruction that is first stored in the input queue memory;

storing, in the output buffer, a processing result value of the processed instruction; and outputting the processing result value stored in the output buffer in response to a time stamp value of the processed instruction being 0.

19. The method of claim 18, wherein the processing the allocated instruction further comprises:

transmitting a stall order to the processor core in response to a time stamp value of the first-stored instruction being predicted to be 0 while an operation of processing the first-stored instruction in the input queue memory is performed.

20. The method of claim 14, wherein, in response to it being undetermined during compiling which memory of the cache and the SPM the instruction is to be allocated to, the allocating allocates the instruction to the cache.

21. A non-transitory computer-readable storage medium having stored therein program instructions for implementing a memory control method of a processor including a processor core, a single port cache, and a multi-port Scratch Pad Memory (SPM), the method comprising:

analyzing a characteristic of at least one instruction executed in the processor core;

allocating the at least one instruction to any one of the single port cache and the multi-port SPM based on the analyzed characteristic; and processing the at least one of the allocated load instruction and the allocated store instruction, wherein the processing comprises:

profiling a program to obtain an execution count of each configuration of the load instruction and the store instruction, and a data closure of each of the load instruction and the store instruction, searching for, from among all combinations of maximal data closures of each of the load instructions and the store instructions, a combination that increases a sum of execution counts of extra configurations, determining a combination of remaining data closures and the found combination, allocating the found combination to the SPM, and allocating the set of remaining data closures to the cache, and wherein the processor core partitions accessed data based on the characteristic such that the characteristic includes profiling information, a data interference graph, and a size of the SPM.

* * * * *